(12) United States Patent
Miyamoto

(10) Patent No.: US 6,370,729 B2
(45) Date of Patent: Apr. 16, 2002

(54) PORTABLE POWER WORKING MACHINE

(75) Inventor: Junichi Miyamoto, Togane (JP)

(73) Assignee: Maruyama Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/754,574

(22) Filed: Jan. 4, 2001

(30) Foreign Application Priority Data

Jan. 4, 2000 (JP) ........................................ 2000-000007

(51) Int. Cl.[7] .............................. A47L 5/36; A47L 9/00
(52) U.S. Cl. ........................................ 15/326; 15/327.5
(58) Field of Search ................................ 15/326, 327.5

(56) References Cited

U.S. PATENT DOCUMENTS

| | | | |
|---|---|---|---|
| 5,011,058 A | * 4/1991 | Sapp et al. | 15/327.5 |
| 5,052,073 A | * 10/1991 | Iida | 15/327.5 |
| 5,195,208 A | 3/1993 | Yamami et al. | |
| 5,457,846 A | * 10/1995 | Kuwano et al. | 15/326 |
| 5,857,439 A | 1/1999 | Will et al. | |
| 6,324,721 B2 | * 12/2001 | Doragrip | 15/326 |

* cited by examiner

Primary Examiner—Chris K. Moore
(74) Attorney, Agent, or Firm—Rosenthal & Osha L.L.P.

(57) ABSTRACT

A portable power working machine has an L-shaped frame, a centrifugal blower fixed on a frame in a state that an intake port is opposed to a upright portion of the frame, and a cover having an upper portion spanned between an upper portion of the upright portion of the frame and the centrifugal blower and side portions extending from respective ends of the upper portion to a horizontal portion of the frame and spanned between a side portion of the upright portion and the centrifugal blower. A plurality of through-holes are formed in the upper portion of the cover, the through-holes communicating an interior space defined by the frame, the centrifugal blower and the cover with an exterior space on an outside of the interior space and having a size to block foreign matter in size greater than a predetermined value from passing through.

10 Claims, 8 Drawing Sheets

PORTABLE POWER WORKING MACHINE

BACKGROUND OF THE INVENTION

1. Field of the Invention

This invention relates to portable power working machines such as backpack blower apparatus and, more particularly, is concerned with a technique for reducing noise from a centrifugal blower as used in a portable power working machine.

2. Related Background Art

In portable power working machines using centrifugal blowers, conventionally various means have been suggested for reducing noise caused from the centrifugal blowers. For example, U.S. Pat. No. 5,195,208 discloses a backpack blower apparatus which is covered with a sound-shielding sheet at the left and right sides and rear portion thereof. U.S. Pat. No. 5,857,439 discloses a backpack power working machine having a sound-absorbing panel provided in a manner closing the gaps in the left and right between the backpack frame and the centrifugal blower.

In the typical backpack power working machine, an intake port of the centrifugal blower is directed toward the backpack frame, thus requiring air to be taken through the gap between the centrifugal blower and the backpack frame. Consequently, in the conventional power working machine having a sound-shielding sheet or sound-absorbing panel as above, the upper gap is widely opened between the backpack frame and the centrifugal blower.

However, where the upper gap is widely opened between the backpack frame and the centrifugal blower, comparatively large foreign matter, such as fallen leaves, enters through the gap and is possibly caught by a net provided in the intake port of the blower. In such a case, the foreign matter must be removed away. However, because the gap is narrow between the backpack frame and the centrifugal blower, there is a problem that time and labor is required for removing the same.

SUMMARY OF THE INVENTION

In order to solve the above problem, a portable power working machine according to the present invention comprising: a frame having a horizontal portion and an upright portion rising from one end of the horizontal portion; a centrifugal blower having an intake port opposed to the upright portion and rested and fixed on the horizontal portion with spacing to the upright portion; a cover having an upper portion spanned between an upper portion of the upright portion and the centrifugal blower and side portions extending from respective ends of the upper portion to the horizontal portion and spanned between side portions of the upright portion and the centrifugal blower; a plurality of through-holes being formed in the upper portion of the cover to communicate an interior space defined by the frame, the centrifugal blower and the cover with an exterior space at an outside of the interior space, the through-hole having a dimension to block a foreign matter in a size greater than a predetermined value from passing through.

With this arrangement, the noise propagated laterally through a gap between the frame upright portion and the centrifugal blower is shielded by the side portion of the cover. Also, although the air to the centrifugal blower is taken through the through-holes in the upper portion, the through-holes are small in size and hence foreign matter, such as large fallen leaves, does not reach to the intake port of the centrifugal blower.

The portable power working machine does not only includes a backpack blower apparatus, but also a backpack spray apparatus, a shoulder blower apparatus and a shoulder spray apparatus.

The cover preferably comprises a sheet member having a first portion structuring the upper portion and second portions extending from respective ends of the first portion to the frame horizontal portion and attached to a side surface of the frame, and a sound-absorbing member fixed on a surface of the second portion of the sheet member on a side of the interior space. The presence of the sound-absorbing member improves the effect of suppressing noise.

It is preferred to fix a sound-absorbing member on the first portion of the sheet member, i.e., the surface in the upper portion of the cover on the side of the internal space. This sound-absorbing member further improves the effect of suppressing noise. Of course, this sound-absorbing member has to be formed with through-holes communicating with the through-holes of the sheet member.

In the case that the sound-absorbing member is made of an elastically deformable material and put in close contact, without gaps, with the side surface of the centrifugal blower, sound-insulating and sound-absorbing properties are improved.

If the sheet member is made in an integral structure, merely attaching the sheet member to the frame completes attaching the sound-absorbing member.

Furthermore, the cover itself may be constructed by a rigid sound-absorbing member only. It is possible to contemplate as a rigid sound-absorbing member a plate having a honeycomb core member and surface plates bonded on opposite surfaces of the honeycomb core member. In this case, as for a honeycomb sandwich plate portion corresponding to the cover upper portion, the interior space and the exterior space are made in communication by removing the surface plate.

Another sound-absorbing member may be fixed on a surface of the side portion comprising a honeycomb sandwich plate on the side of the interior space.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the course of the following detailed description, reference will be made to the attached drawings in which.

DESCRIPTION OF THE PREFERRED EMBODIMENTS

Figure 1:
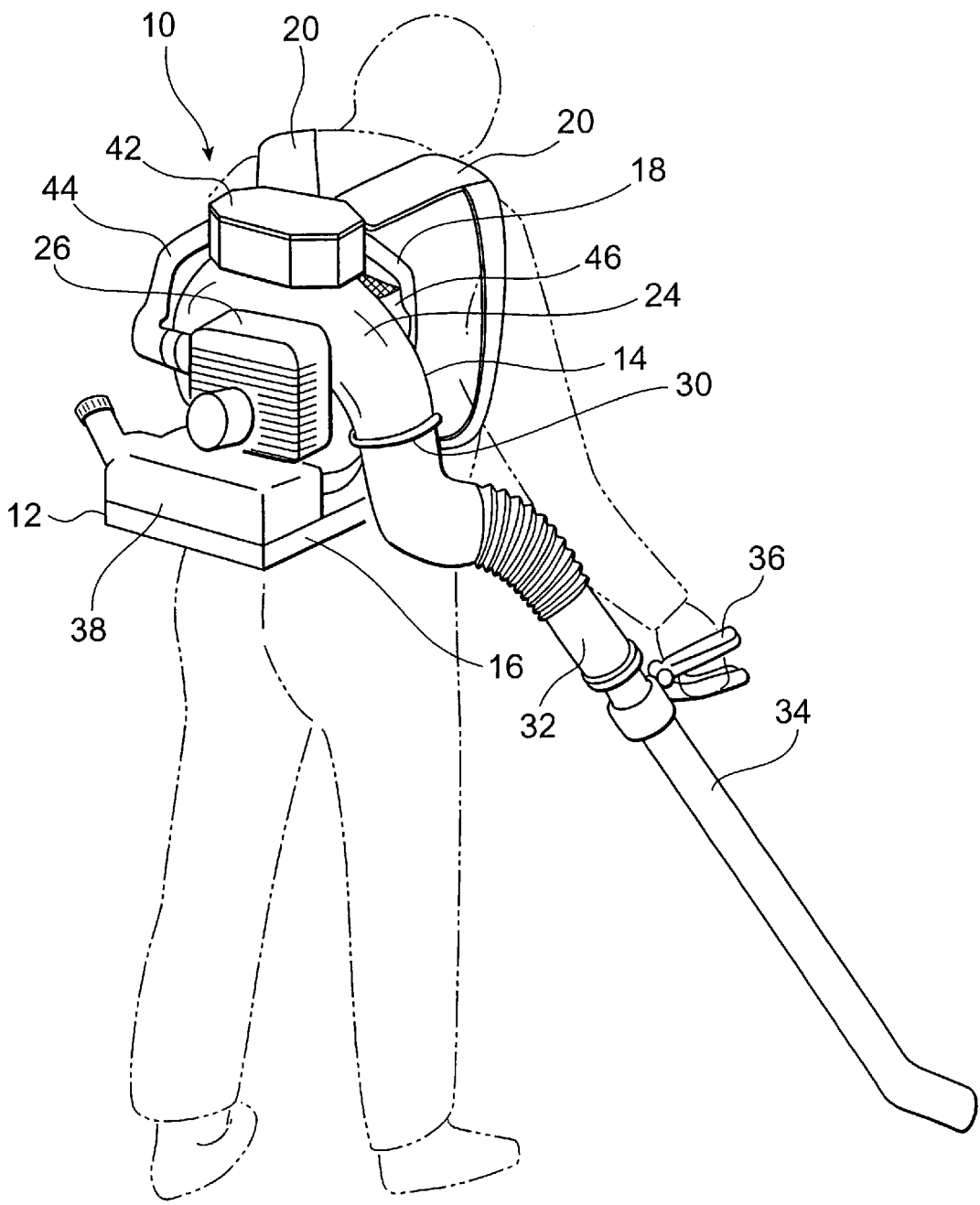
FIG. 1 is a view showing a use state of a backpack blower apparatus as a portable power working machine of the present invention.
Figure 2:
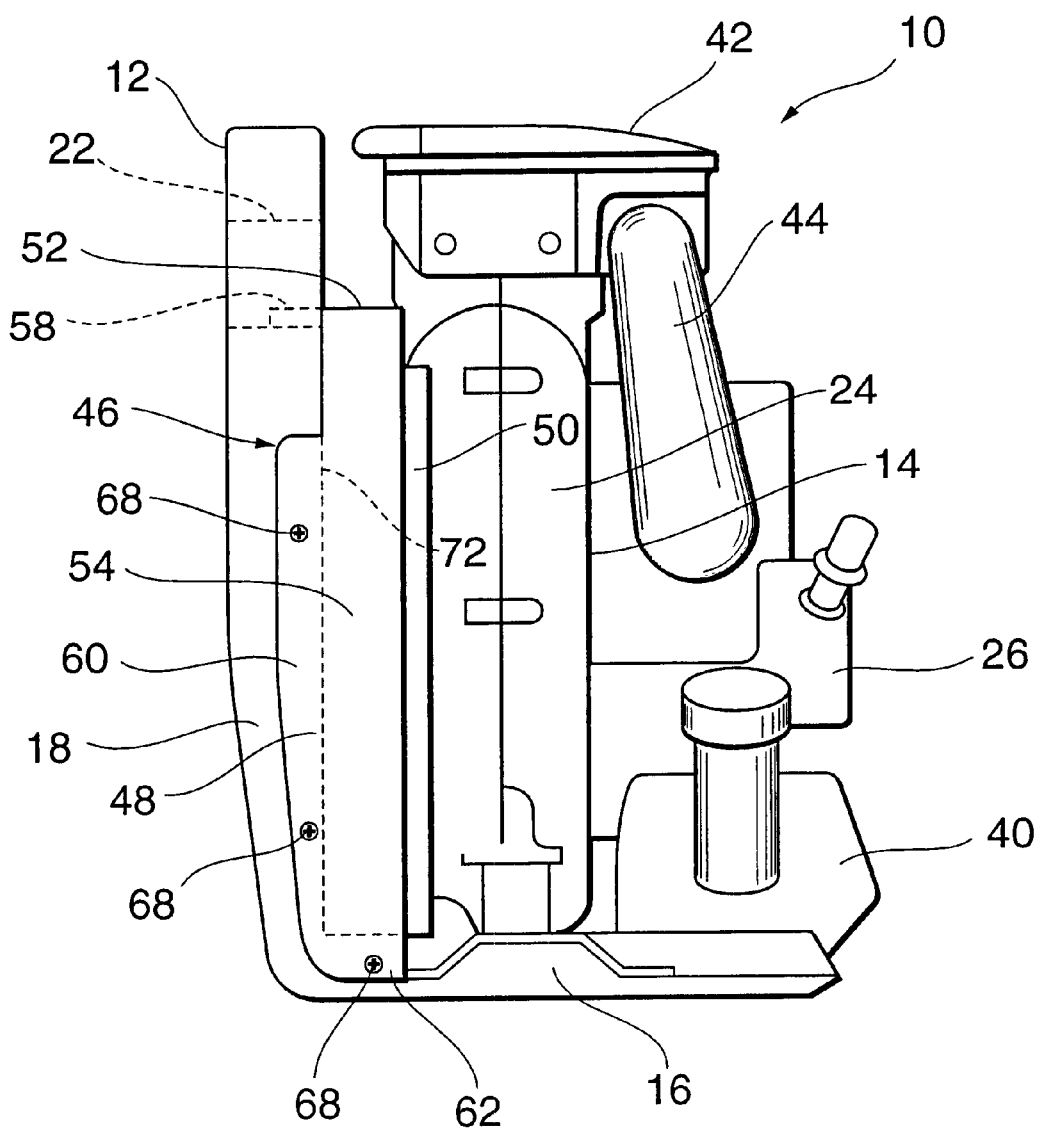
FIG. 2 is a side view showing the blower apparatus of the invention.
Figure 3:
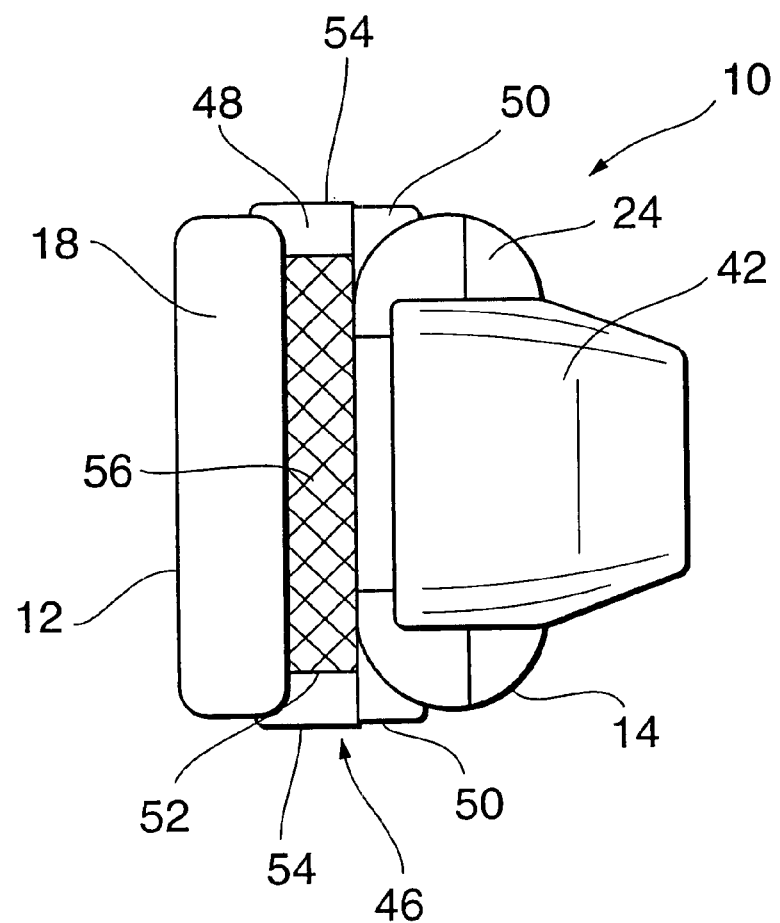
FIG. 3 is a plan view showing the blower apparatus of FIG. 2.

FIGS. 1 to 3 show a backpack blower apparatus 10 according to the present invention. The backpack blower apparatus 10 is a kind of portable power working machines used for jetting air to collect fallen leaves, cut grass or dust in a desired place. The blower apparatus 10 as shown has a backpack frame 12 to be carried on the back of an operator or user and a centrifugal blower 14 of the invention mounted on the backpack frame 12.

The backpack frame 12 is an L-shaped frame having a horizontal portion 16, and an upright portion 18 that rises nearly vertical from one end of the horizontal portion 16. The upright portion 18 is in the form to be contacted by the back of the operator or user. Also, the backpack frame 12 has two shoulder straps 20 (shown only in FIG. 1) attached for the operator to shoulder it. The shoulder strap 20 at an upper end is attached using a through-hole 22 opened at an upper part of the upright portion 18 of the backpack frame 12. In a usual use state the operator, in standing, shoulders the backpack 12, the upright portion 18 extends nearly vertical while the horizontal portion 16 extends in a direction of nearly horizontal and away from the back of the operator. In the present specification, the direction that the horizontal portion 16 extends is defined as rear with reference to the use state for convenience, in order to use the terms "upper", "lower", "front", "left", "right" and so on.

Figure 4:
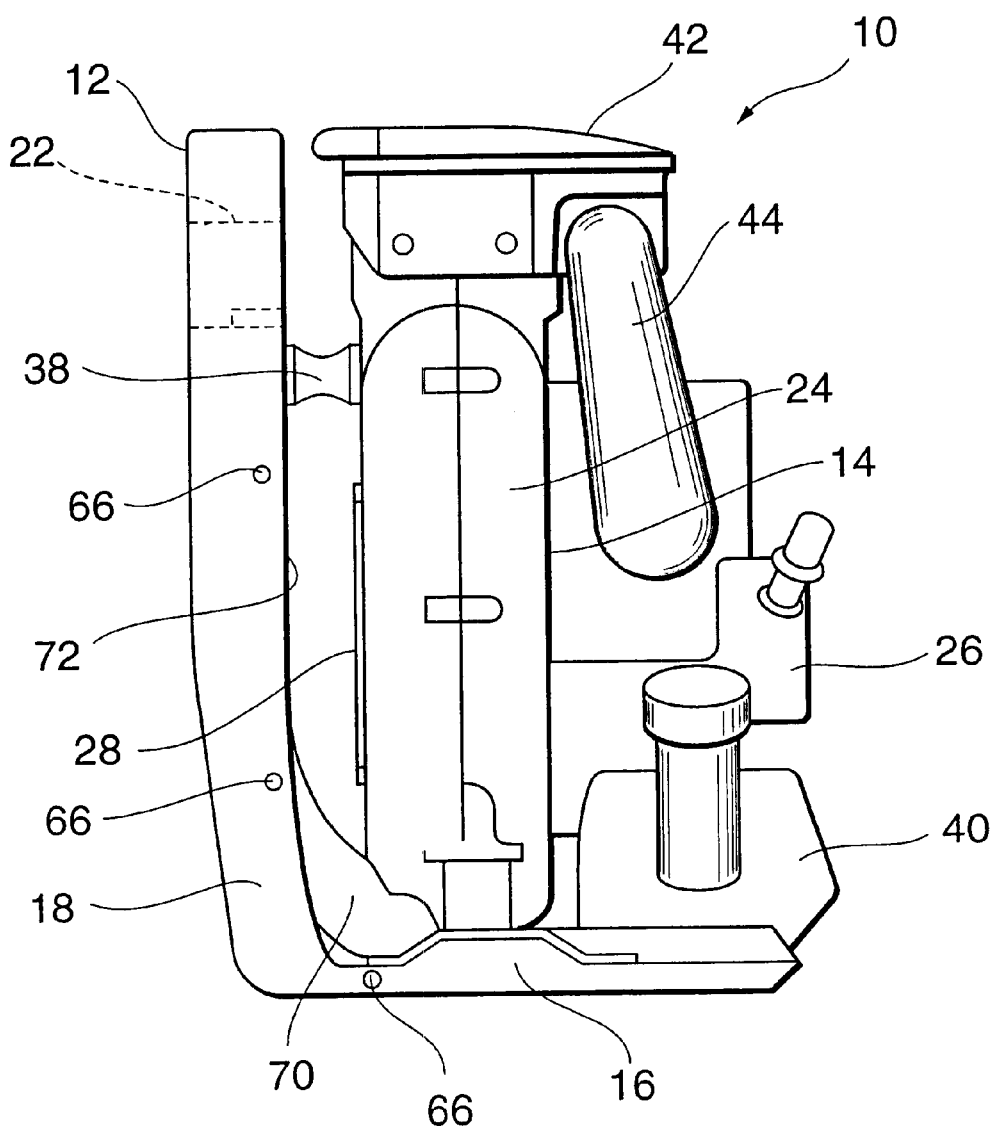
FIG. 4 is a side view showing the blower apparatus removed of a cover.

The centrifugal blower 14 has a casing 24 to accommodate an impeller (not shown) therein. On a rear side of the casing 24, an internal combustion engine 26 is arranged as a drive source for the centrifugal blower 14. The internal combustion engine 26 has a rotary shaft (not shown) coupled to the impeller. As shown in FIG. 4 depicting a blower apparatus removed of a cover mentioned later, an aperture 20 is formed in a center of a front wall of the casing 24. This aperture 20 serves as an intake port for the centrifugal blower 28. The casing 24 has, in an outer periphery, a volute portion 30 communicating with a central portion inside the casing accommodating the impeller. As shown in FIG. 1, the volute portion 30 is connected, at terminal or outlet end, with an air jet tube 34 through a flexible blower tube 32. The tube 34 is provided with a handle 36 to be gripped by the operator to control a direction of a tip of the tube 34.

The centrifugal blower 14 thus constructed is mounted on the backpack frame 12 such that the casing 24 having the intake port 28 at its front wall faces, with a predetermined spacing, the upright portion 18 of the backpack frame 12. Preferably, the centrifugal blower 14 is placed on the horizontal portion 16 of the backpack frame 12 through a vibration-absorbing member, e.g., a rubber mount (not shown) and held, at an upper part of the casing 24, by the upright portion 18 of the backpack frame 12 through a vibration-absorbing member, e.g. a rubber mount 38 (see FIG. 4). The rubber mount 38 absorbs vibration from the internal combustion engine 26 and centrifugal blower 14 and maintains spacing at between the upright portion 18 of the backpack 12 and the centrifugal blower 14. The engine 26 in this state is desirably positioned distant away from the body of the operator and hence the vibration and noise of the engine 26 is less propagated to the operator.

The fuel for driving the engine 26 is reserved within a fuel tank 40 mounted on the horizontal portion 16 of the backpack frame 12 and at an underneath of the engine 26. Also, an air cleaner 42 for air clarification is fixed at the above of the centrifugal blower 14. The air clarified by the air cleaner 42 is guided to a carburetor (not shown) of the engine 26 through a connection pipe 44.

Figure 5:
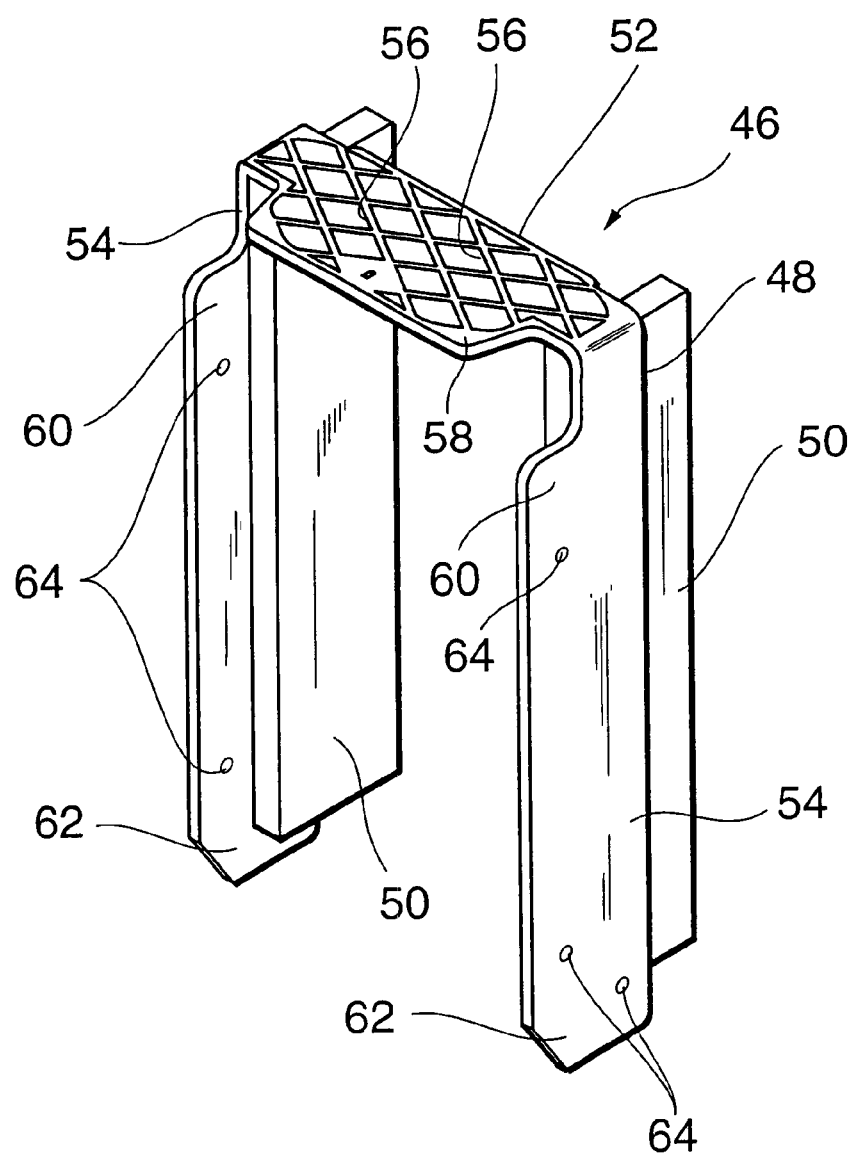
FIG. 5 is a perspective view showing the cover.

Furthermore, the blower apparatus 10 has a cover 46 arranged between the upright portion 18 of the backpack frame 12 and the centrifugal blower 14. The cover 46 is structured, as shown in FIG. 5, by a sheet member 48 formed of polypropylene or the like to be bent but having a certain degree of rigidity and a sound-absorbing member 50 firmly fixed on the sheet member 48.

The sheet member 48 is generally in the form of a U-shape or arch, and has a first portion 52 in a center and second portions 54 extending, vertically and in parallel with each other, from opposite ends of the first portion 52.

The first portion 52 of the sheet member 48 is in a mesh structure having a plurality of through-holes 56. The through-hole 56 has a size set in a dimension not to allow to pass the foreign matter greater than a predetermined size, specifically the foreign matter such as fallen leaves possibly causing trouble upon sucked into the centrifugal blower 14.

The second portion 54 of the sheet member 48 is firmly fixed with a sound-absorbing member 50 formed, for example, of urethane or the like generally in a rectangular parallelepiped form by suitable means, such as adhesive.

Also, the first portion 52 and the second portion 54 of the sheet member 48 are integrally formed with extending portions 58, 60 extending outward from one edge thereof. The extending portion 58 of the first portion 52 has a width (length in a lengthwise direction of the first portion 52) given equal to or somewhat smaller than a width of the the hole 22 in the upright portion 18 of the backpack frame 12. Also, each free end of the second portion 54 of the sheet member 48 protrudes from the sound-absorbing member 50. The protruding portion 62 and the extending portion 60 of second portion 54 are formed with a small hole 64 for passing through a screw.

Figure 6:
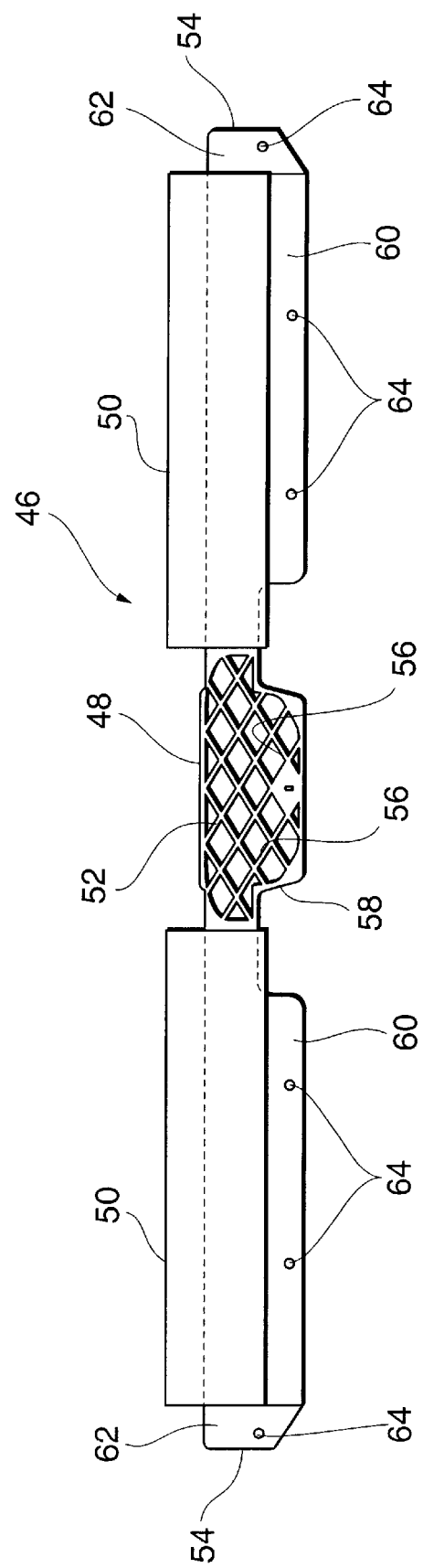
FIG. 6 is a development view showing the cover showing FIG. 5.

The cover 46 may be formed by bonding a sound-absorbing member 50 to a flat sheet member 48 shown in FIG. 6, followed by being bent.

In a state that the cover 46 is assembled in the blower apparatus 10, the first portion 52 of the sheet member 48 is spanned generally horizontally between the upper portion of the backpack frame 12 and the upper portion of the centrifugal blower 14. The extending portion 58 is inserted in the through-hole 22 of the upright portion 18 of the backpack frame 12 and rested on a lower wall surface defining the through-hole 22. This aligns the cover 46 vertically up and down and horizontally left and right. Also, the first portion 52 at a front edge except for the extending portion 58 contacts a rear surface of the upright portion 18 of the backpack frame 12 while the rear edge of the first portion 52 contacts a front surface of the centrifugal blower 14.

Also, the second portions 54 at the left and right of the sheet member 48 are positioned nearly flush with left and right side surfaces of the backpack frame 12. The extending portion 60 of the second portion 54 is placed on the corresponding side surface of the upright portion 18 of the backpack frame 12. Also, the lower end 62 of the second portion 54 is placed on the corresponding side surface of the horizontal portion 16 of the backpack frame 12. In a state the cover 46 is placed in a proper position, the small holes 64 of the extending portion 60 and lower end 62 of the second portion 54 are aligned with screw holes 66 formed in the side surface of the backpack frame 12 (see FIG. 4). Accordingly, the cover is fixed to the backpack frame 12 by inserting a screw 68 in each small hole 64 and screwing it in a corresponding screw hole 66. In this state, the sound-absorbing member 50 at its front edge is in contact with the rear surface of the upright portion 18 of the backpack frame 12. Further, the sound-absorbing member 50 at its lower end is in contact with a curved portion 70 between the upright portion 18 and the horizontal portion 16 of the backpack frame 12. In this embodiment, the sound-absorbing member 50 protrudes from the sheet member 48 to a position covering a side surface of the centrifugal blower 14. In attaching the second portion 54 of the sheet member 48 to the backpack frame 12 by means of the screws, as the sheet member 48 possesses a certain degree of rigidity, the sound-absorbing member 50 is urged on the side surface of the centrifugal blower 14 and put into contact, without gaps, with the side surface of the centrifugal blower 14 due to elastic deformation of the sound-absorbing member itself.

In the conventional, two of sound absorbing sheet and sound insulating sheet have been independently attached to the blower apparatus, thus requiring time and labor. In this embodiment, however, because two sound absorbing members 50 are previously attached on the sheet member 48, the sound absorbing members 50 are easy to attach to the blower apparatus 10.

When the cover 46 is mounted in this manner, an interior space 72 is defined among the backpack frame 12, the centrifugal blower 14 and the cover 46. The space 72 is communicated with the intake port 28 of the centrifugal blower 14. Also, the space 72 is communicated with an exterior space substantially through the upper portion of the cover 46, i.e., only through the through-holes 56 in the first portion 52 of the sheet member 48.

When conducting cleaning using the backpack power working blower apparatus 10 constructed as above, the operator carries the blower apparatus 10 at the backpack frame 12 on the back. When the internal combustion engine 26 is driven to rotate the impeller of the centrifugal blower 14, air suction force is caused in the intake port 28 of the centrifugal blower 14. Thus, the air around the blower apparatus 10, particularly the air above the blower apparatus 10, is introduced into the interior space 72 through the through-holes 56 of the cover 46. The air is further introduced from the intake port 28 for the centrifugal blower 14 into the centrifugal blower 14. The air taken through the intake port 28 flows from the volute portion 30 of the casing 24 to the hose 32 connected to the exit port and then to the air jet tube 34. If the operator grips the handle 36 on the jet tube 34 and directs the tip of the jet tube 34 toward refuse, such as cut grass or fallen leaves, then the air jetting through the tip of the jet tube 34 blows the refuse away and collect it to a predetermined place.

By the suction of air by the centrifugal blower 14, foreign matter, such as fallen leaves, also is ready to be sucked into the intake port 28 of the centrifugal blower 14 but blocked at left and right sides of the interior space 72 at side portions of the cover 46, i.e., the second portion 54 of the sheet member 48 and the sound-absorbing member 50. Also, in the upper region of the interior space 72, the foreign matter greater than the size of the through-holes 56 of the cover 46 is not allowed to pass through the through-holes 56. Accordingly, the foreign matter is prevented from being sucked into the centrifugal blower 14 through the intake port 28 of the centrifugal blower 14. In the related-art blower apparatus, there has been troublesome in removing the foreign matter, such as fallen leaves, collected on the net provided in the intake port. However, in the blower apparatus 10 of this embodiment, collection is at the upper portion 52 of the cover 46 easy to access, thus making removal easy.

Meanwhile, the rotation of the impeller of the centrifugal blower 14 and hence the movement of the impeller blade nearby an inner surface of the rear wall of the casing 24 causes air compressional waves and generates noise. The noise, despite generated from the intake port 28 toward the interior space 72, is absorbed by the sound-absorbing member 50. Thus, the noise dissipated around the backpack blower apparatus 10 is greatly reduced. Moreover, because the sound-absorbing member 50 is in close contact also with the side surface of the casing 24 of the centrifugal blower 14, the noise generated from the side surface of the casing 24 is reduced.

Incidentally, it can be contemplated that the through-holes for air intake are provided in the second portion 54 and sound-absorbing member 50 of the sheet member 48. However, the provision of through-holes in such a position is not preferred because there is a possibility that the sleeve of an operator's clothes be sucked. Accordingly, the through-holes 56 have to be formed only in the upper portion 52 of the cover 46.

Figure 7:
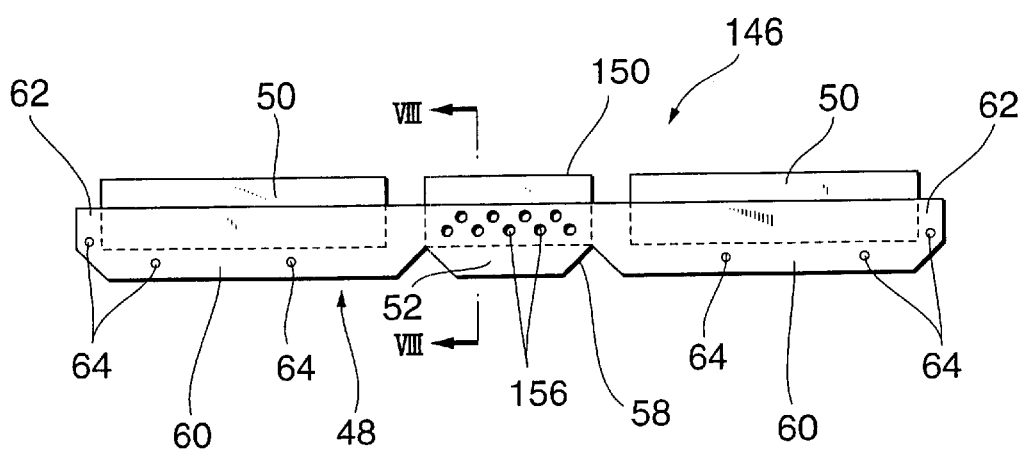
FIG. 7 is a development view showing another embodiment of the cover.
Figure 8:
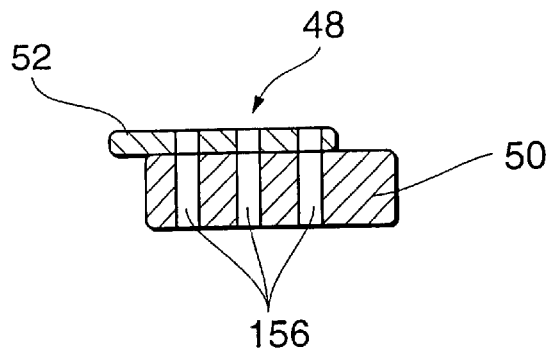
FIG. 8 is a sectional view along the line VIII—VIII in FIG. 7.

FIG. 7 is a development view of a cover 146 having a structure that the cover of FIG. 5 is partly modified. FIG. 8 is a sectional view along a line VIII—VIII in FIG. 7. The cover 146 sown in FIG. 7 and FIG. 8 is different from the cover 46 shown in FIG. 5 in that a sound absorbing member 150, such as of urethane, is formed also on the first portion 52 of the sheet member 48. Also, the through-hole 156 is circular in shape and penetrates through not only the sheet member 48 but also the sound absorbing member 150. The through-holes 156 are evenly distributed throughout the first portion 52. The through-holes 156 are set in a size that foreign matter such as fallen leaves is not allowed passing through. In other respects, they are substantially in the same structure as those of the cover 46 shown in FIG. 5. Accordingly, in FIG. 7 and FIG. 8, the identical or corresponding portions to those of the cover 46 shown in FIG. 5 are denoted by the identical reference numerals, omitting detailed explanation thereof.

With such structure of the cover 146, the noise within the interior space 72 is absorbed by the sound-absorbing member 150 also at the upper region of the interior space 72. Thus, noise is further reduced from dissipating around the blower apparatus 10.

Figure 9:
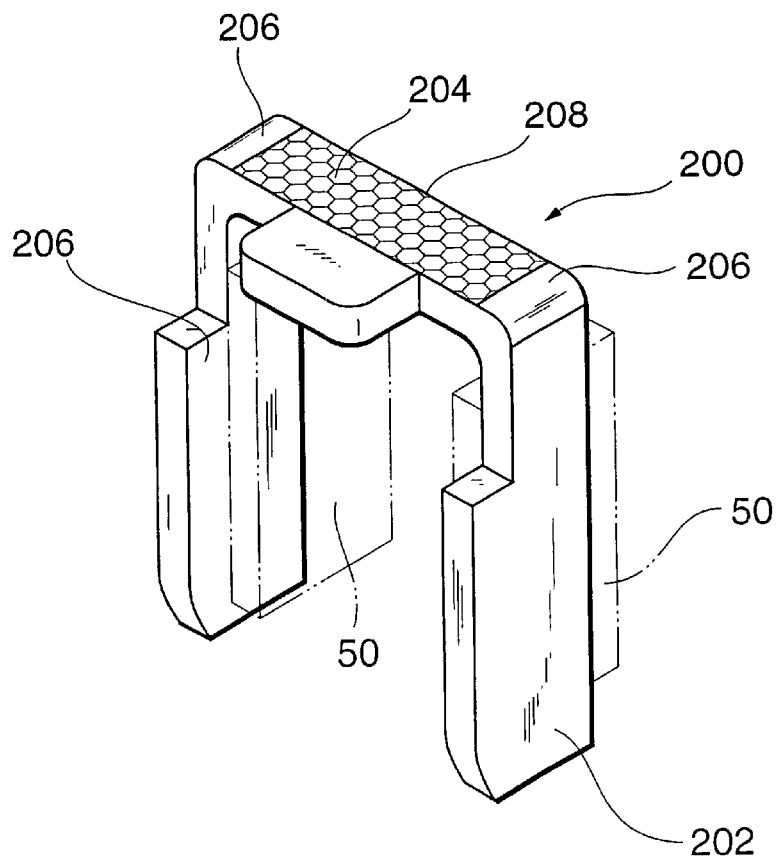
FIG. 9 is a perspective view showing still another cover.

FIG. 9 is a view showing still another cover 200. This cover 200 uses a plate 202 of a honeycomb sandwich structure in place of the sheet member. The honeycomb-sandwich-structured plate 202 has a honeycomb core member 204 bonded, on opposite surfaces, with thin surface plates 206. In the upper portion 208 of the honeycomb sandwich plate 202, the honeycomb core member 204 is exposed by stripping the surface plate 206. This provides communication between the interior space 72 and the exterior space through the honeycomb core member 204. Incidentally, because the honeycomb sandwich plate 202 has a sound absorbing function, the noise within the interior space 72 can be absorbed without providing a sound-absorbing member. Naturally, the provision of a sound-absorbing member 50 is not excluded.

Although the preferred embodiment of the present invention was explained in detail above, it is needless to say that the invention is not limited to the foregoing embodiment.

For example, the sheet member, although formed of a synthetic resin such as polypropylene in the embodiment, may be made from a metal plate.

Also, because the sheet member does not have holes in the second portion, noise suppression effect is obtained unless a sound-absorbing member is provided.

Also, the shape or position of the cover, sheet member and/or sound absorbing member is appropriately modified in accordance with the shape of the backpack frame, mounting position of the centrifugal blower or the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A portable power working machine comprising:
   a frame having a horizontal portion and a upright portion rising from one end of said horizontal portion;
   a centrifugal blower having an intake port opposed to said upright portion and fixed on said horizontal portion with spacing to said upright portion; and
   a cover having an upper portion spanned between an upper portion of said upright portion and said centrifugal blower and side portions extending from respective ends of said upper portion to said horizontal portion and spanned between side portions of said upright portion and said centrifugal blower, said cover having a plurality of through-holes being formed in said upper portion thereof to communicate an interior space defined by said frame, said centrifugal blower and said cover with an exterior space at an outside of said interior space, said through-holes having a dimension to block foreign matter in a size greater than a predetermined value from passing through.

2. A portable power working machine according to claim 1, wherein said cover comprises a sheet member having a first portion structuring said upper portion and second portions extending from respective ends of said first portion to said horizontal portion and attached to a side surface of said frame and a sound-absorbing member fixed on a surface of said second portion of said sheet member on a side of said interior space.

3. A portable power working machine according to claim 2, comprising a sound-absorbing member fixed on a surface of said first portion of said sheet member on a side of said interior space and through-holes communicating with the through-holes formed in said first portion.

4. A portable power working machine according to claim 2, wherein said sound-absorbing member is elastically deformable and in close contact, without gaps, with a side surface of said centrifugal blower.

5. A portable power working machine according to claim 2, wherein said sheet member is of an integral structure.

6. A portable power working machine according to claim 1, wherein said cover is formed by a rigid sound-absorbing member.

7. A portable power working machine according to claim 6, wherein said sound-absorbing member is a plate having a honeycomb core member and surface plates bonded on opposite surfaces of said honeycomb core member, said plate at an upper portion is removed of said surface plate.

8. A portable power working machine according to claim 6, wherein another sound-absorbing member is fixed on a surface in the side portion of said cover on a side of said interior space.

9. A portable power working machine according to claim 6, wherein said cover is of an integral structure.

10. A portable power working machine according to claim 1, being a backpack blower apparatus.

* * * * *

UNITED STATES PATENT AND TRADEMARK OFFICE
CERTIFICATE OF CORRECTION

PATENT NO. : 6,370,729 B2
DATED : April 16, 2002
INVENTOR(S) : Junichi Miyamoto

It is certified that error appears in the above-identified patent and that said Letters Patent is hereby corrected as shown below:

<u>Title page,</u>
Item [73], change the Assignee information to read:
-- Maruyama Mfg. Co., Inc. --

Signed and Sealed this

Fifth Day of November, 2002

Attest:

Attesting Officer

JAMES E. ROGAN
*Director of the United States Patent and Trademark Office*